United States Patent [19]
Ando

[11] Patent Number: 6,035,122
[45] Date of Patent: Mar. 7, 2000

[54] COMPILER FOR CONVERTING SOURCE PROGRAM INTO OBJECT PROGRAM HAVING INSTRUCTION WITH COMMIT CONDITION

[75] Inventor: Hideki Ando, Hyogo, Japan

[73] Assignee: Mitsubishi Denki Kabushiki Kaisha, Tokyo, Japan

[21] Appl. No.: 09/078,489

[22] Filed: May 14, 1998

Related U.S. Application Data

[62] Division of application No. 08/548,374, Nov. 1, 1995, Pat. No. 5,771,377.

[30] Foreign Application Priority Data

Nov. 30, 1994 [JP] Japan ................................. 6-296695

[51] Int. Cl.[7] .............................. G06F 9/45; G06F 9/00
[52] U.S. Cl. ......................... 395/705; 395/708; 395/709; 712/234; 712/239
[58] Field of Search .................................. 395/705, 706, 395/707, 708, 709, 800, 580, 581, 586; 712/233, 234, 239

[56] References Cited

U.S. PATENT DOCUMENTS

| | | | |
|---|---|---|---|
| 4,942,525 | 7/1990 | Shintai et al. | 712/217 |
| 5,421,020 | 5/1995 | Levitan | 712/237 |
| 5,450,585 | 9/1995 | Johnson | 395/709 |

(List continued on next page.)

FOREIGN PATENT DOCUMENTS 0 514 136 A1  11/1992  European Pat. Off. .

OTHER PUBLICATIONS

Michael D. Smith et al., "Efficient Superscalar Performance Through Boosting", ASPLOS V—Oct. 1922/MA, 1992, pp. 248–259.

"Effective Compiler Support for Predicated Execution Using the Hyperblock", by Scott A. Mahlke et al., *IEEE*, 1992.

"Reducing the Cost of Branches", by Scott McFarling et al., *IEEE*, 1986.

Dubey, P; Flynn, M.; "Branch Strategies: Modeling and Optimization"; IEEE Transactions on Computers; vol. 40, Issue 10, pp. 1159–1167, Oct. 1991.

Mahlke et al., "Effective Compiler Support for Predicated Execution Using the Hyperblock," IEEE, pp. 45–54, Sep. 1992.

*Primary Examiner*—Tariq R. Hafiz
*Assistant Examiner*—Brian Sattizahn
*Attorney, Agent, or Firm*—McDermott, Will & Emery

[57] ABSTRACT

A processing device executes an instruction speculatively, and execution result of the instruction becomes valid when all the predictions about true/false of branch condition are correct, and the instruction has a commit condition indicating the number of branch conditions. The processing device includes a commit condition decoder for decoding the commit condition; ALU's; a sequential register file for sequentially holding data obtained from ALU; a shadow register file for speculatively holding data obtained from the ALU; true/false register having determination entries, each of which holds undetermined information if true/false of the corresponding branch condition is not yet determined, holds true information if the corresponding branch condition is true, and holds false information if the corresponding branch condition is false; execution control circuit for comparing true/false of an instruction decode entry provided from the commit condition decoder with true/false of the determination entry and controlling the sequential register file to sequentially hold data if they correspond with each other or otherwise controlling the shadow register file to speculatively hold data; and a commit control circuit for comparing true/false of the instruction decode entry with true/false of the determination entry and transferring the data held in the shadow register file to the sequential register file if each true/false of the instruction decode entry coincides with true/false of the corresponding determination entry.

1 Claim, 11 Drawing Sheets

U.S. PATENT DOCUMENTS

| | | | |
|---|---|---|---|
| 5,511,198 | 4/1996 | Hotta | 395/709 |
| 5,561,776 | 10/1996 | Popescu et al. | 712/239 |
| 5,627,985 | 5/1997 | Fetterman et al. | 712/217 |
| 5,649,225 | 7/1997 | White et al. | 395/800 |
| 5,715,440 | 2/1998 | Ohmura et al. | 395/580 |
| 5,732,253 | 3/1998 | McMahan | 712/239 |
| 5,761,467 | 6/1998 | Ando | 712/200 |
| 5,768,574 | 6/1998 | Dutton et al. | 712/226 |
| 5,809,294 | 9/1998 | Ando | 712/233 |
| 5,854,935 | 12/1998 | Enomoto | 395/709 |
| 5,941,986 | 8/1999 | Kulkarni | 712/245 |

FIG.2
TF REGISTER 10
| FIRST ENTRY | | SECOND ENTRY | | ... | M-TH ENTRY | |
|---|---|---|---|---|---|---|
| VALIDITY | VALUE | VALIDITY | VALUE | | VALIDITY | VALUE |
| $T_{v1}$ | $T_{d1}$ | $T_{v2}$ | $T_{d2}$ | | $T_{vm}$ | $T_{dm}$ |
FIG.3
| COMMIT CONDITION PORTION 16 | INSTRUCTION OPERATION PORTION 15 |
|---|---|
| TF [1] & TF [2] | r6=r14+r15 |
FIG.4
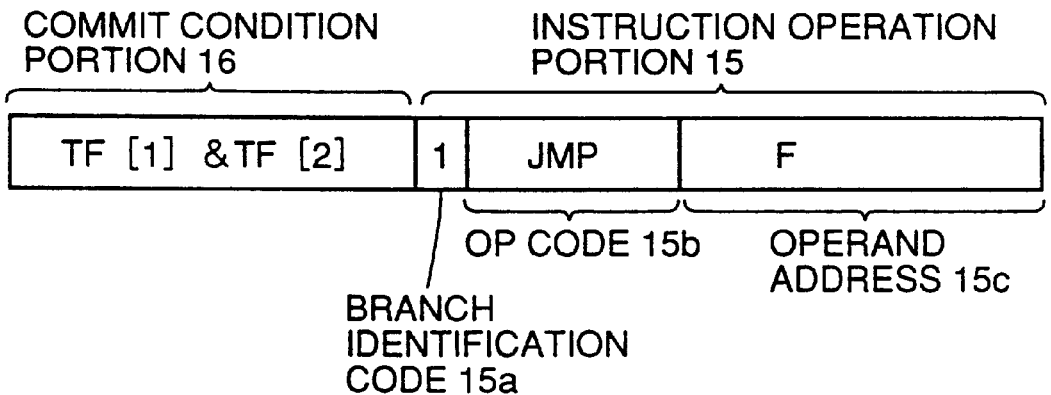
| COMMIT CONDITION PORTION 16 | INSTRUCTION OPERATION PORTION 15 | | |
|---|---|---|---|
| TF [1] & TF [2] | 1 | JMP | F |
BRANCH IDENTIFICATION CODE 15a
OP CODE 15b
OPERAND ADDRESS 15c

FIG. 7 always ? I1;TF [1] ? I2;
always ? C1;TF [1] &TF [2] &TF [3] ? I4;   always? C2;TF [1] &TF [2] ? I3;
TF [1] ? J1;TF [1] &TF [2] ? J2;TF [1] &TF [2] &TF [3] ? J3;TF [1] &TF [2] &TF [3] ? J4;
always? C3;

WHERE

I1:r2=r0+r1
I2:r4=r12+r13
I3:r6=r14+r15
I4:r7=r6+1
C1:if (r2≧r3) TF [1] =true;else TF [1] =false
C2:if (r12==0) TF [2] =true;else TF [2] =false
C3:if (r6<r13) TF [3] =true;else TF [3] =false
J1:go to E (type 2)
J2:go to F (type 2)
J3:go to G (type 2)
J4:go to H (type 1)

FIG.8

| COMMIT CONDITION | CODE [X3,X2,X1] |
|---|---|
| always | [0,0,0] |
| TF [1] | [0,0,1] |
| TF [1] &TF [2] | [0,1,1] |
| TF [1] &TF [2] &TF [3] | [1,1,1] |

COMMIT CONDITION CODING

FIG.9

OUTPUT OF COMMIT CONDITION DECODER 50

| FIRST ENTRY | | SECOND ENTRY | | | M-TH ENTRY | |
|---|---|---|---|---|---|---|
| VALIDITY | VALUE | VALIDITY | VALUE | | VALIDITY | VALUE |
| Cv1 | Cd1 | Cv2 | Cd2 | | Cvm | Cdm |

FIG.10

OUTPUT OF COMMIT CONDITION DECODER 50

(A)
| FIRST ENTRY | SECOND ENTRY | THIRD ENTRY |
|---|---|---|
| TRUE | TRUE | DON'T CARE |

(B)
| FIRST ENTRY | SECOND ENTRY | THIRD ENTRY |
|---|---|---|
| TRUE | FALSE | DON'T CARE |

TF REGISTER 10

(C) ⇨ SEQUENTIAL EXECUTION
| FIRST ENTRY | SECOND ENTRY | THIRD ENTRY |
|---|---|---|
| TRUE | TRUE | ... |

(D) ⇨ SPECULATIVE EXECUTION
| FIRST ENTRY | SECOND ENTRY | THIRD ENTRY |
|---|---|---|
| UNDETERMINED | UNDETERMINED | ... |

(E) ⇨ SPECULATIVE EXECUTION
| FIRST ENTRY | SECOND ENTRY | THIRD ENTRY |
|---|---|---|
| TRUE | UNDETERMINED | ... |

(F)
| FIRST ENTRY | SECOND ENTRY | THIRD ENTRY |
|---|---|---|
| TRUE | FALSE | ... |

FIG.14
| COMMIT CONDITION | CODE [Y2,Y1] |
|---|---|
| always | [0,0] (0) |
| TF [1] | [0,1] (1) |
| TF [1] &TF [2] | [1,0] (2) |
| TF [1] &TF [2] &TF [3] | [1,1] (3) |
COMMIT CONDITION CODING
FIG.15
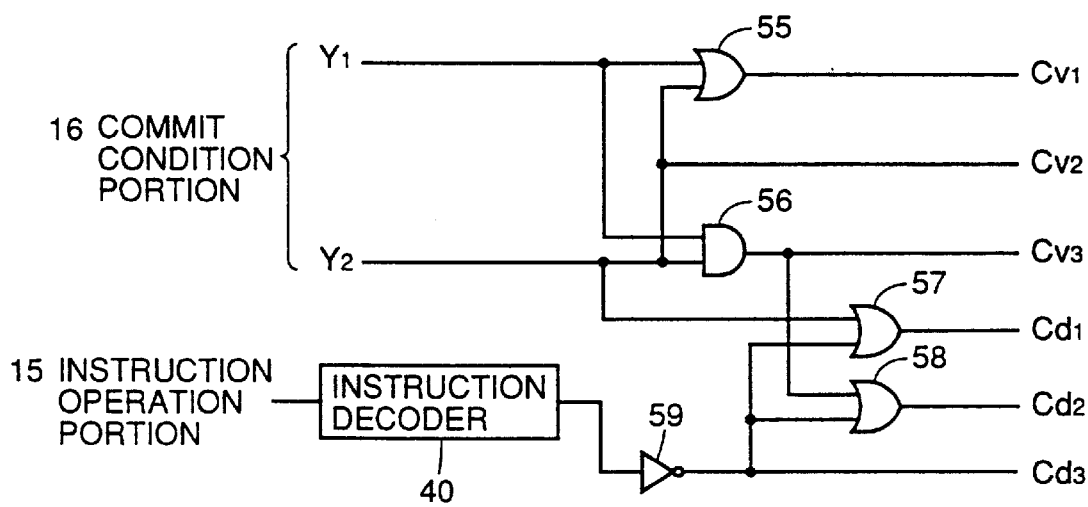
FIG.16
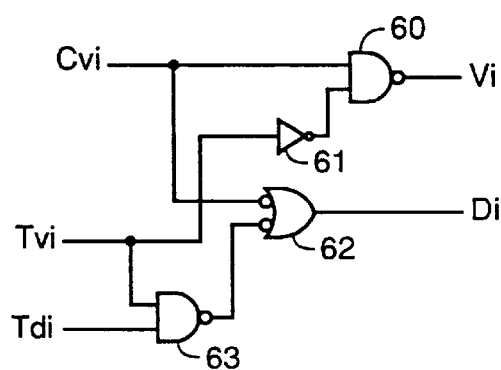

COMPILER FOR CONVERTING SOURCE PROGRAM INTO OBJECT PROGRAM HAVING INSTRUCTION WITH COMMIT CONDITION

This application is a division of U.S. application Ser. No. 08/548,374 filed Nov. 1, 1995 now U.S. Pat. No. 5,771,377.

BACKGROUND OF THE INVENTION

1. Field of the Invention

The present invention relates to processing devices capable of speculative execution of an instruction, and more particularly, to a processing device in which an executed result of an instruction becomes valid when all the predictions about true/false of one or more branch conditions are correct.

2. Description of the Background Art

FIG. 17 is a block diagram showing a structure of a microprocessor as a conventional instruction processor.

Referring to FIG. 17, the microprocessor includes a register file 1 formed of a plurality of registers, an Arithmetic and Logic Unit (hereinafter referred to as an ALU) 2 for performing an operation on data held in register file 1, a memory 3 for holding instructions as instruction codes, a program counter 4 for holding addresses for instructions to be executed and applying such an address to memory 3, and a circuit 5 for incrementing program counter 4.

The microprocessor further includes an instruction register 6 for holding an instruction code fetched from memory 3, an instruction decoder 7 for decoding the instruction code and generating a control signal for controlling reading/writing from/to register file 1 and a control signal for controlling ALU 2, a test circuit 8 for determining a branch condition based on data read out from register file 1, and a circuit 9 for calculating a target address in response to a control signal from test circuit 8.

Now, operations of the microprocessor will be described.

An instruction to be executed among instructions held in memory 3 is first addressed by program counter 4. The addressed instruction is fetched from memory 3 and held in instruction register 6. The instruction held in instruction register 6 is decoded by instruction decoder 7 and reading/writing from/to register file 1 is controlled and ALU 2 is controlled in response to the content of the instruction.

If the instruction fetched by instruction register 6 is an operation instruction, data is respectively read out from two registers in register file 1. These pieces of read out data are operated by ALU 2, and the resultant data is written in a register in register file 1.

Meanwhile, if an instruction fetched by instruction register 6 is a branch instruction, two pieces of data read out from register file 1 are applied to test circuit 8. Based on these pieces of data, test circuit 8 determines whether or not the branch condition is satisfied. More specifically, test circuit 8 determines whether the condition is true or false. If the condition is true, the target address is calculated by target address calculation circuit 9 and applied to program counter 4. If the condition is false, program counter 4 is incremented.

FIG. 5 is a flow chart showing an example of a program. According to the flow chart, instruction a1: r2=r0+r1 (more specifically, the values of registers r0 and r1 in register file 1 are added and stored in register r2 in register file 1) is executed in a basic block A. After condition a2: if (r2<r3) is determined, either basic block B or E is initiated. More specifically, instruction b1: r4=r12+r13 in basic block B is to be executed when r2<r3 is determined as false, and instruction e1 (not shown) in basic block E is to be executed when r2<r3 is determined as true.

In accordance with the above-described conventional microprocessor, neither instruction b1 in block B nor instruction e1 in block E cannot be executed until condition a2 in block A is determined. For example, data resulting from execution of instruction b1 is written in a register r4 in register file 1 only when condition a2 in block A is false. To write data resulting from execution of instruction b1 in register r4 with condition a2 being true destroys data previously held by register r4.

Thus, the conventional microprocessor is not capable of executing instructions b1, c1 and d1 to be executed based on conditions a2 in block A, b2 in block B and c2 in block C shown in FIG. 5 until conditions a2, b2 and c2 are determined.

Although microprocessors having a plurality of ALU's have been proposed in recent years, such a microprocessor still cannot execute an instruction to be executed based on one or more conditions before determining these conditions. Since some of the plurality of ALU's are not operating at all for some moments, ALU's cannot be used efficiently, and sufficiently high speed operation processing cannot be achieved.

SUMMARY OF THE INVENTION

Therefore, it is an object of the present invention to provide an instruction processing device capable of executing an instruction to be executed after determination of a condition before such a determination is made and processing an instruction more rapidly.

Another object of the present invention is to provide an instruction processing device capable of significantly reducing a structure of hardware in achieving the object above.

According to one aspect of the present invention, in a processing device capable of speculatively executing an instruction, a result of execution of an instruction becomes valid when prediction about true/false of one or more branch conditions is all correct, and the device includes an operation unit, a data hold unit, a hit/miss hold unit, an execution control unit, and a commit control unit. The operation unit executes an instruction and determines true/false of a branch condition. The data hold unit holds data obtained as a result of execution of the instruction by the operation unit. The hit/miss hold unit has one or more determination entries corresponding to one or more branch conditions. Each determination entry (i) holds undetermined information if true/false of the corresponding branch condition is not yet determined by the operation unit, (ii) holds hit information if a prediction about true/false of the corresponding branch condition is determined as correct by the operation unit, and (iii) holds miss information if a prediction about true/false of the corresponding branch condition is determined as incorrect by the operation unit. The execution control unit (i) controls the operation unit so as to execute an instruction sequentially and controls the data hold unit so as to sequentially hold data obtained as a result of execution of the instruction, if each determination entry of the hit/miss hold unit holds hit information, and (ii) controls the operation unit so as to speculatively execute an instruction and controls the data hold unit so as to speculatively hold data obtained as a result of execution of the instruction, if each entry of the hit/miss hold unit does not hold miss information and at least one determination entry holds undetermined information. The commit control unit controls the data hold unit so as to sequentially re-hold the speculatively held data when the undetermined information held in each entry of the hit/miss hold unit is changed to hit information by determination of true/false for the branch condition made by the operation unit.

Therefore, an instruction is speculatively executed and data obtained as a result of execution is speculatively held even if true/false of a branch condition is undetermined. When prediction about true/false of the branch condition is all correct, the speculatively held data is re-held sequentially. As a result, a plurality of instructions can be executed simultaneously, thereby enhancing processing speed of an instruction.

According to another aspect of the present invention, a processing device capable of speculatively executing an instruction includes a commit condition decode unit, an operation unit, a data hold unit, a true/false hold unit, an execution control unit, and a commit control unit, in which a result of execution of an instruction becomes valid when prediction about true/false of one or more branch conditions is all correct. An instruction has an instruction commit condition indicating the number of branch conditions. The commit condition decode unit decodes the instruction commit condition and supplies one or more instruction decode entries corresponding to one or more branch conditions. Each instruction decode entry indicates either one of true and false. The operation unit executes an instruction and determines true/false of a branch condition. The data hold unit holds data obtained as a result of execution of an instruction by the operation unit. The true/false hold unit has one or more determination entries corresponding to one or more branch conditions. Each determination entry (i) holds undetermined information if true/false of the corresponding branch condition is not yet determined by the operation unit, (ii) holds true information if the corresponding branch condition is determined as true by the operation unit, and (iii) holds false information if the corresponding branch condition is determined as false by the operation unit. The execution control unit compares the true/false of the instruction decode entry provided by the commit condition decode unit with the true/false of the determination entry of the true/false hold unit in a corresponding manner, and (i) controls the operation unit to sequentially execute an instruction and controls the data hold unit to sequentially hold data obtained as a result of execution of the instruction if each true/false of the instruction decode entry coincides with the true/false of the corresponding determination entry, (ii) controls the operation unit to speculatively execute an instruction and controls the data hold unit to speculatively hold data obtained as a result of execution of the instruction, if any of true/false of the instruction decode entries coincides with the true/false of the corresponding determination entry and each determination entry corresponding to the other instruction decode entries holds undetermined information, or if each determination entry holds undetermined information. The commit control unit compares the true/false of the instruction decode entry provided from the commit condition decode unit with the true/false of the determination entry of the true/false hold unit in a corresponding manner, and controls the data hold unit to sequentially re-hold the speculatively held data when the undetermined information held in each entry of the true/false hold unit is changed to true or false information by determination of the true/false for the branch condition made by the operation unit. The commit condition decode unit decodes the instruction commit condition and provides one or more instruction decode entries corresponding to one or more branch conditions. Each instruction decode entry indicates either one of true and false.

Therefore, an instructions is speculatively executed and data obtained as a result of execution thereof is speculatively held even if true/false of the branch condition is undetermined. When each true/false of the instruction decode entry coincides with true/false of the corresponding determination entry, the speculatively held data is re-held sequentially. As a result, a plurality of instructions can be executed simultaneously, thereby enhancing the processing speed of instructions. In addition, since the instruction commit condition is decoded, the number of bits of the instruction commit condition can be reduced.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a diagram for use in illustration of the configuration of a true/false register in the processing device of FIG. 1.

FIG. 3 is a diagram for use in illustration of the configuration of an instruction code for executing an instruction in the processing device of FIG. 1.

FIG. 4 is a diagram for use in illustration of the configuration of a branch instruction code for executing a branch instruction in the processing device of FIG. 1.

FIG. 7 is a program list showing an example of an object program obtained by the compiler in FIG. 6 for processing the source program in FIG. 5 with the processing device shown in FIG. 1.

FIG. 8 is a diagram for use in illustration of a code of a commit condition portion in the instruction code shown in FIGS. 3 and 4.

FIG. 9 is a diagram for use in illustration of an output of a commit condition decoder in the processing device of FIG. 1.

FIG. 10 is diagram for use in illustration of the concept of the function of an execution control circuit in the processing device of FIG. 1.

FIG. 14 is a diagram for use in illustration of the configuration of an instruction code in accordance with a second embodiment of the present invention.

FIG. 15 is a circuit diagram showing the configuration of a commit condition decoder in accordance with the second embodiment of the present invention.

FIG. 16 is a circuit diagram showing the configuration of a comparison circuit in a commit condition calculation circuit in accordance with a third embodiment of the present invention.

DESCRIPTION OF THE PREFERRED EMBODIMENTS

First Embodiment

Figure 1:
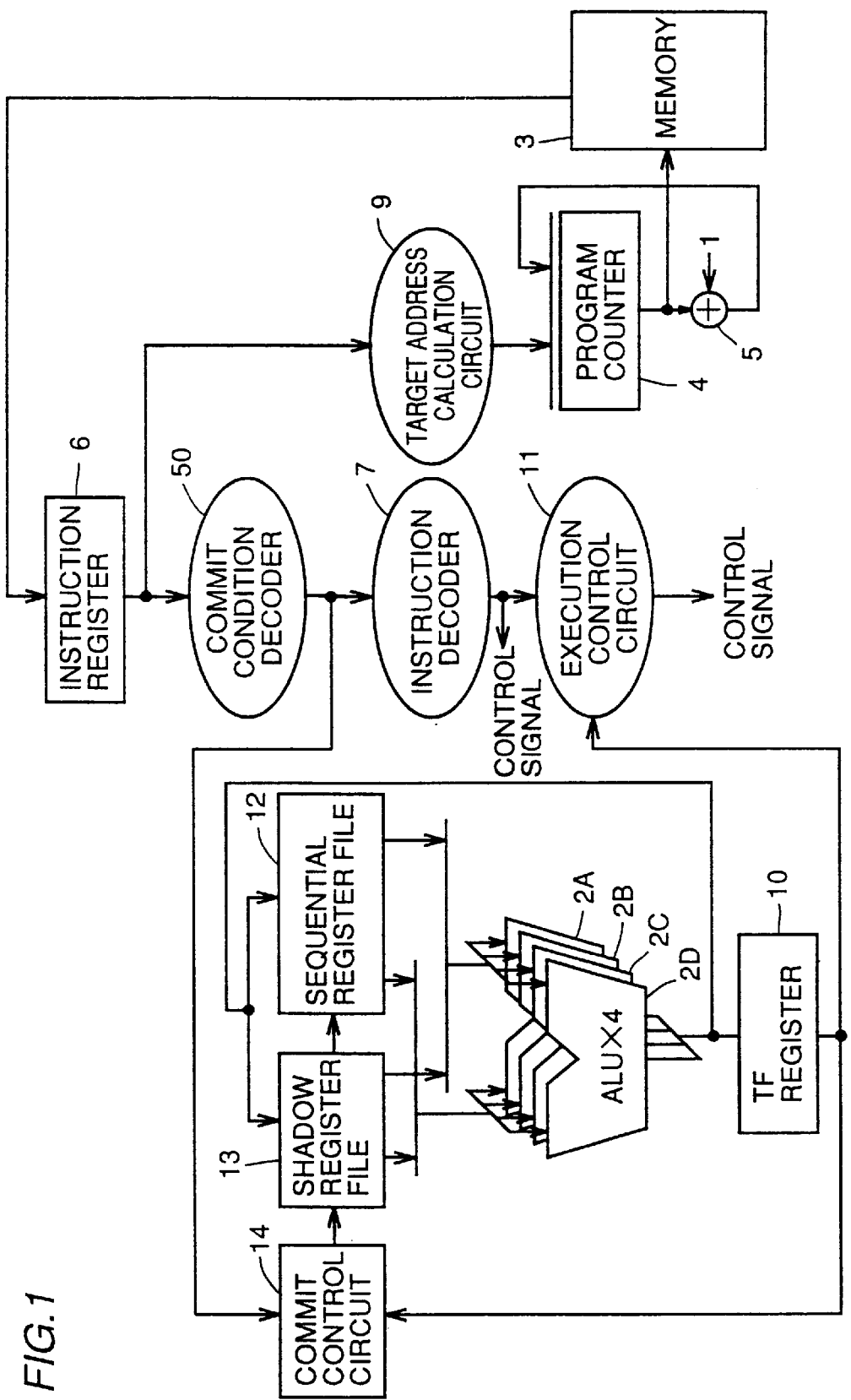
FIG. 1 is a block diagram showing the construction of a processing device in accordance with a first embodiment of the present invention.

Now, one embodiment of the present invention will be described. FIG. 1 is a block diagram showing the structure of a microprocessor as a processing device in accordance with a first embodiment. Note that the same reference characters denote the same or corresponding portions.

Referring to FIG. 1, the microprocessor includes four ALU's 2A–2D, a memory 3, a program counter 4 for applying the address of an instruction to be executed to memory 3, a circuit 5 for incrementing program counter 4, an instruction register 6 for holding an instruction fetched from memory 3, an instruction decoder 7 for decoding an instruction held in instruction register 6 and generating a control signal to control ALU's 2A–2D and the like and a control signal to control holding in a register the data generated by ALU's 2A–2D, and a circuit 9 for calculating a target address.

Figure 17:
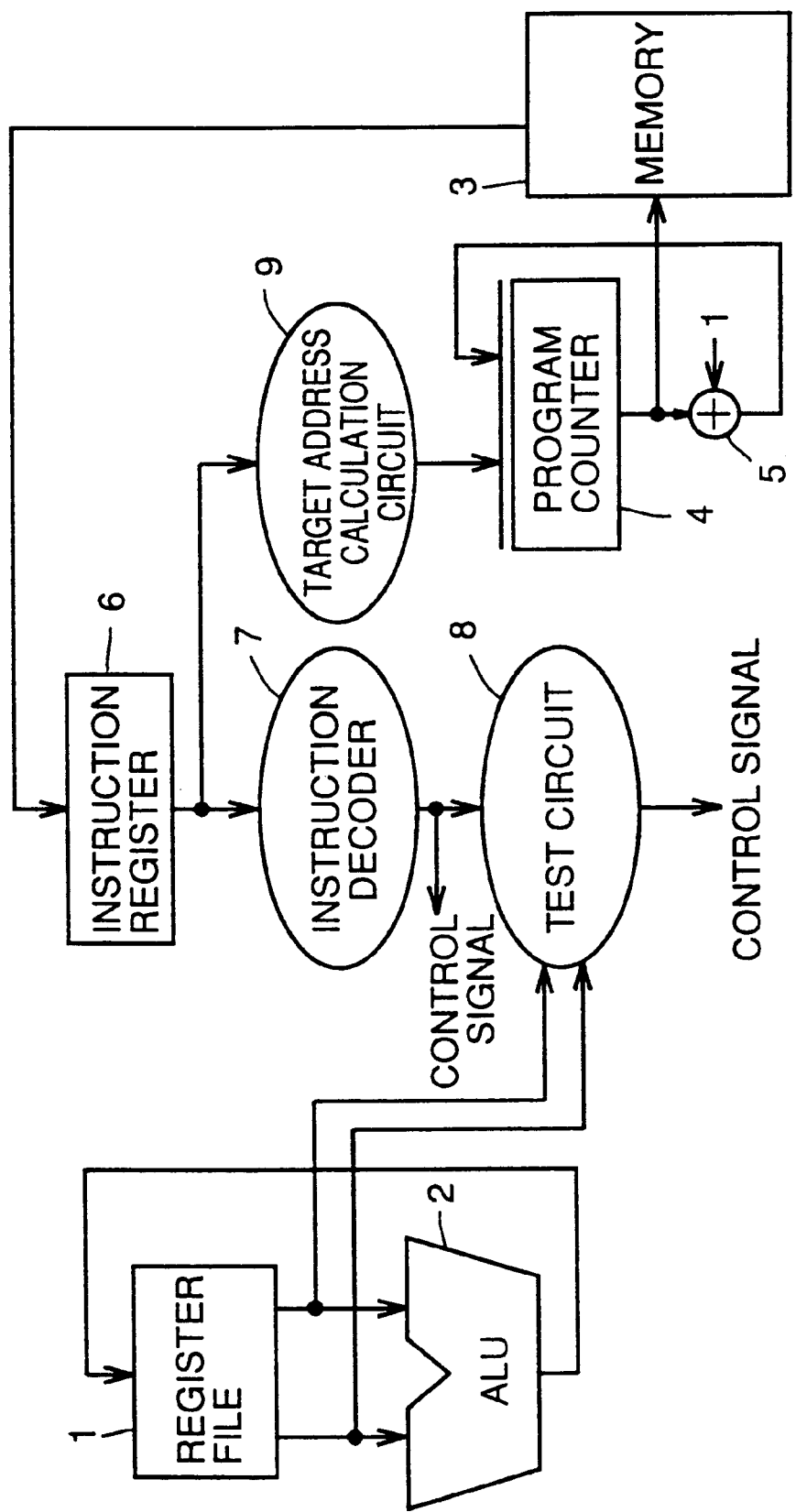
FIG. 17 is a block diagram showing the configuration of a conventional processing device.

In contrast to the conventional microprocessor shown in FIG. 17, this microprocessor further includes a true/false register (TF register) 10, an execution control circuit 11, a sequential register file 12, a shadow register file 13, a commit control circuit 14, and a commit condition decoder 50.

FIG. 2 shows the configuration of TF register 10. Referring to FIG. 2, TF register 10 includes m entries. True/false of a branch condition is determined in ALU's 2A–2D so as to decide whether to branch or not, and the determined result is held in one of m entries. Each entry is formed of 2 bits, validity bit Tv and value bit Td, and holds one of true information of a certain condition being true, false information of the condition being false, and undetermined information of true or false for the condition being undetermined.

TABLE 1

| validity | value | meaning |
| --- | --- | --- |
| 1 | 1 | true |
| 1 | 0 | false |
| 0 | X | undetermined |

X: arbitrary value

Referring to Table 1, the condition information of TF register 10 will be described.

If validity bit Tv is "1" and value bit Td is "1", the condition is true. Meanwhile, if validity bit Tv is "1" and value bit Td is "0", the condition is false. If validity bit Tv is "0", true or false for the condition is undetermined regardless of the value of value bit Td.

FIG. 3 shows the configuration of an instruction code fetched by memory 3 shown in FIG. 1 and processed by the microprocessor. Referring to FIG. 3, the instruction code is formed of an instruction operation portion 15 and a commit condition portion 16. Instruction operation portion 15 corresponds to an instruction code which can be processed by a conventional microprocessor. Instruction decoder 7 shown in FIG. 1 decodes instruction operation portion 15, and outputs a control signal for executing an instruction (r6=r14+r15) to one of ALU's 2A–2D.

Meanwhile, commit condition portion 16 is a portion to specify a condition necessary for execution of an instruction indicated in instruction operation portion 15. In other words, whether or not the executed result of the instruction (r6=r14+r15) is valid is determined by the content of commit condition portion 16. Commit condition portion 16 is formed of a code designating an entry of true/false register 10. "TF[1] & TF[2]" shown in FIG. 3 means that the executed result of the instruction is valid if first and second entries of TF register 10 are true.

FIG. 4 shows the configuration of a branch instruction code for a branch instruction. The branch instruction code is formed of commit condition portion 16 having the same configuration as that in FIG. 3 and instruction operation portion 15. Instruction operation portion 15 is formed of a branch identification code 15a for identifying the kind of a branch instruction, a op code 15b for indicating a branch instruction, and an operand address 15c for indicating a target address. Branch identification code 15a will be described later. If the branch instruction is, for example, an instruction to branch to a block F shown in FIG. 5, the address of "FF" is designated. Operand address 15c shown in FIG. 4.

The instruction code shown in FIGS. 3 and 4 is output from instruction register 6. Commit condition portion 16 and branch identification code 15a of an instruction code are decoded by commit condition decoder 50. The op code 15b and operand address 15c of an instruction code are decoded by instruction decoder 7.

Next, a program for operating the microprocessor in accordance with the present embodiment will be described below. Here, a case is considered where operations of the flow chart shown in FIG. 5 are executed by the microprocessor.

Figure 5:
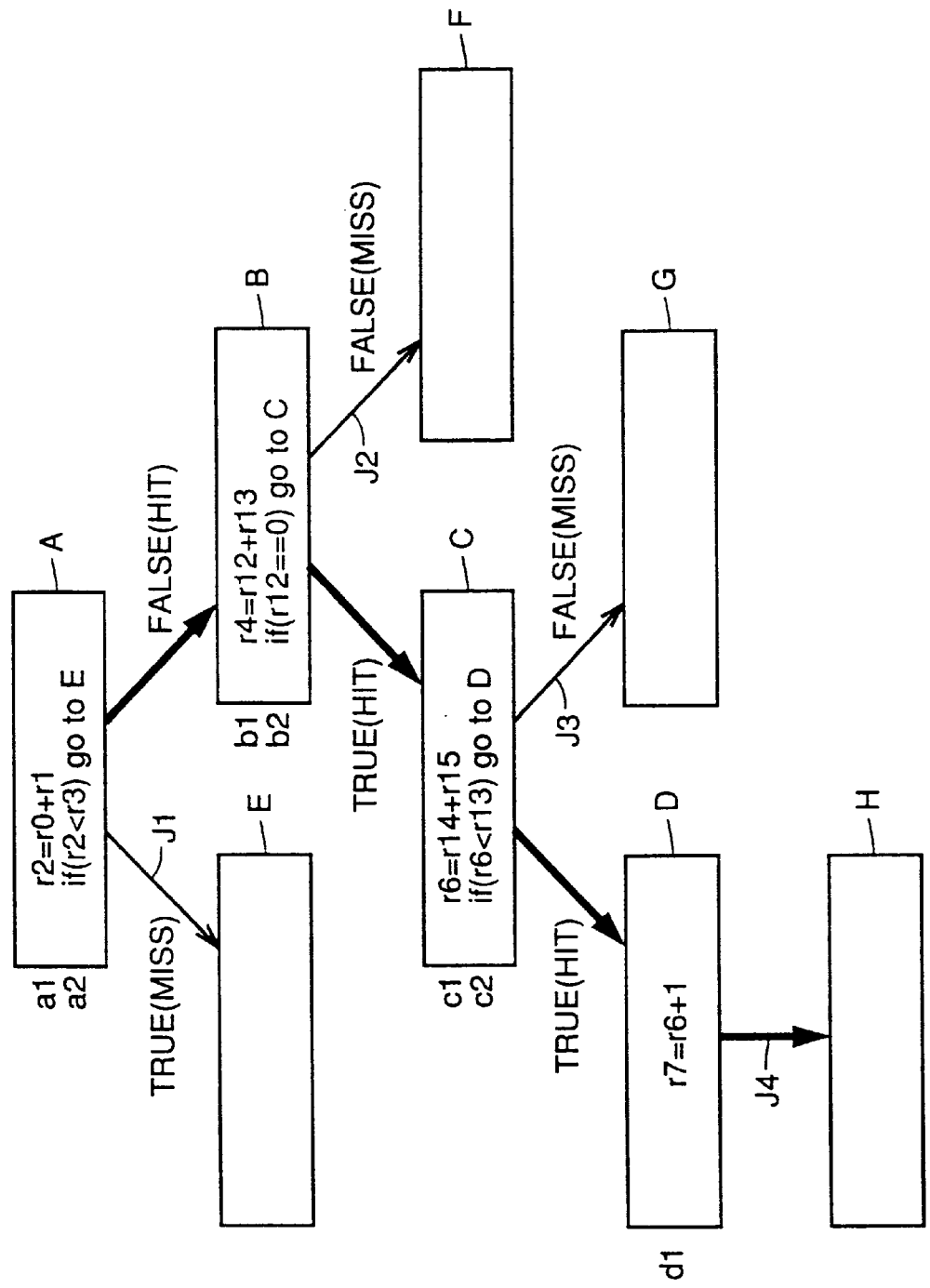
FIG. 5 is a flow chart showing an example of a program.

Referring to FIG. 5, for example, an instruction a1: r2=r0+r1 is to be executed and a branch instruction a2: r2<r3 is to be determined in block A. If r2<r3 is true, a branch to block E is performed; and if it is false, a branch to block B is performed. Branch instructions b2 and c2 are determined similarly in blocks B and C to branch to other blocks.

Generally, in executing an instruction to be executed based on a plurality of conditions, control flows following complicated paths are present. When the program shown in FIG. 5 is to be executed, there are four possible control flows: A→E, A→F, A→G, and A→H. When this program is actually executed, however, the execution path tends to be concentrated on one of the four control flows. According to the literature by S. McFarling, the concentration of branch direction is approximately 85%. This is described in detail by S. McFarling in "Reducing the Cost of Branches", 13th Annual International Symposium on Computer Architecture, pp. 396–403, June 1986.

Figure 6:
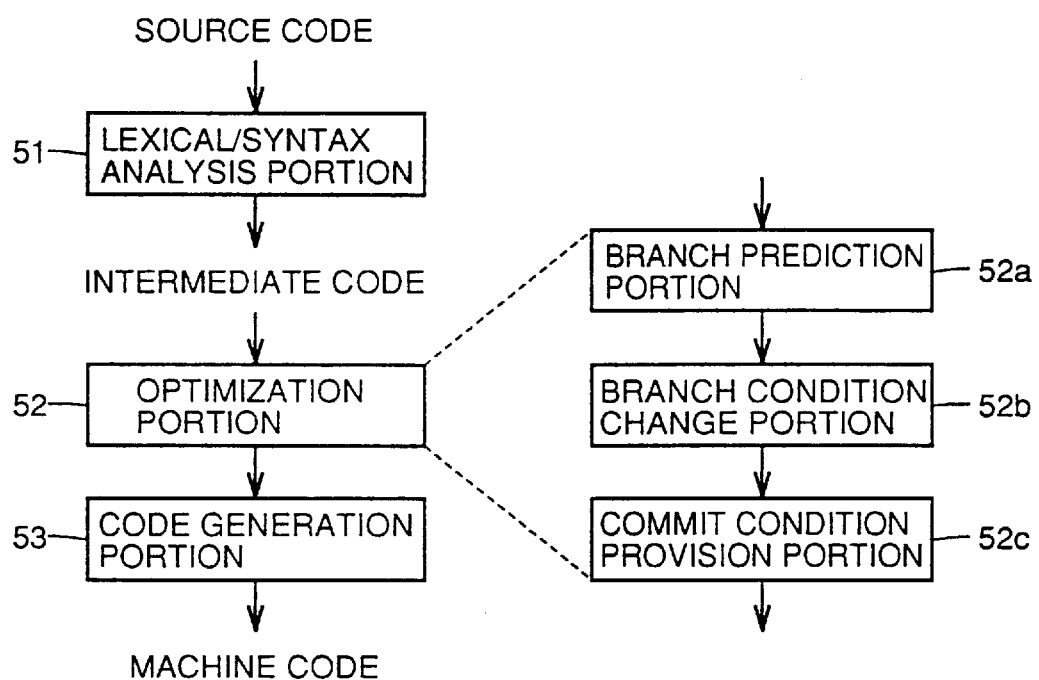
FIG. 6 is a block diagram showing the configuration of a compiler for compiling a source program shown in FIG. 5.

A compiler shown in FIG. 6 generates an object program shown in FIG. 7 for executing the source program in FIG. 5 by utilizing such concentration of the control flows.

Referring to FIG. 6, the compiler includes a lexical/syntax analysis portion 51 for converting a source program including a source code to a more basic program and analyzing the structure of the converted program to generate an intermediate code, an optimization portion 52 for optimizing the generated intermediate code to be implemented in the minimum number of cycles, and a code generation portion 53 for converting the optimized intermediate code to a machine code forming an object program of the optimized code. Optimization portion 52 includes a branch prediction portion 52a for predicting true/false of a branch condition, a branch condition change portion 52b for changing the branch condition so that the predicted true/false is all true, and a commit condition provision portion 52c for providing an instruction with the number of branch conditions as a commit condition. Branch prediction portion 52a executes the source program based on a given example and takes a profile thereof to predict a control flow which is highly probable to be taken. The predicted control flow is called a "trace". When the flow is actually branched in the predicted direction, the case is called "a branch prediction is a hit"; and when the flow is not branched in the predicted direction, the case is called "a branch prediction is a miss".

It is assumed that a path "A→B→C→D→H" is predicted as the control flow with a high branch probability by the profiling in the flow chart shown in FIG. 5.

FIG. 7 shows an example of a list of an object program generated by compiling a source program based on prediction information on concentration of the control flows. This object program also executes the flow chart shown in FIG. 5. In the figure, each row is formed of a plurality of instruction codes. Each instruction code is formed of instruction operation portion 15 and commit condition portion 16. Instructions indicated at instruction operation portions 15 of instruction codes in the same row are executed simultaneously. Instruction codes are separated from each other by ";". Instruction operation portion 15 and commit condition portion 16 are separated by "?".

Commit condition portion 16 of each instruction code shown in the figure will be described below.

(1) Commit condition "always" indicates that an instruction shown in instruction operation portion 15 is always valid regardless of true/false in TF register 10.

(2) Commit condition "TF[1]" indicates that a first entry of TF register 10 is designated.

(3) Commit condition "TF[1] & TF[2]" indicates that first and second entries of TF register 10 are designated.

(4) Commit condition "TF[1] & TF[2] & TF[3]" indicates that first, second, and third entries of TF register 10 are designated.

Description will now be made of instruction operation portion 15.

(1) Instructions (I1, I2, I3, I4) Instruction I1: r2=r0+r1, for example, indicates that values of registers r0 and r1 stored in either sequential register file 12 or shadow register file 13 are added to be stored in register r2 of the file designated by execution control circuit 11.

(2) Branch conditions (C1, C2, C3) Branch condition C1: if (r2≧r3) TF[1]=true; else TF[1]=false, for example, indicates that when the value of register r2 stored in sequential register file 12 or shadow register file 13 is equal to or greater than the value of register r3, "true" is stored in the first entry of TF register 10, or otherwise "false" is stored therein.

More specifically, branch conditions C1, C2, and C3 are determined in ALU's 2A–2D. Branch condition C1 writes true/false obtained as a result of the determination to the first entry of TN register 10. Branch conditions C2 and C3 write true/false obtained as a result of the determination to second and third entries of TF register 10, respectively. TF register 10 holds the true/false. (3) Branch instructions (J1, J2, J3, J4) J1: go to E, for example, indicates a jump to block E. J1, J2, and J3 indicate a jump of type 2 while J4 indicates a jump of type 1 (description of types 1 and 2 will be made later). When the branch instruction is executed, the address of the instruction code for executing a target instruction calculated by target address calculation circuit 9 is applied to program counter 4, and the instruction code present at the calculated address of memory 3 is fetched and sent to instruction register 6.

The program list shown in FIG. 7 is generated as follows in accordance with the prediction information about concentration of the control flows.

(1) In instructions C1–C3 each evaluating a branch condition and writing the result of evaluation to TF register 10, when the branch condition is a branch inside the trace, "true" indicating a hit is written to the entry of TF register 10 corresponding to the branch condition, while "false" indicating a miss is written when it is a branch to the outside of the trace. For example, referring to FIG. 5, if branch condition a1: r2<r3 of block A is "false", the branch is made inside the trace; and if branch condition a1 is "true", the branch is made outside the trace. However, if condition r2≧r3 is "true", it is a branch inside the trace from A to B. As a result, as in the case of instruction C1 shown in FIG. 7, the branch condition is changed in branch condition change portion 52b in FIG. 6 so as to write "true" in TF[1] if r2≧r3, or otherwise write "false". More specifically, if a branch is made inside the trace (the case where the branch prediction is a hit), "true" is held successively in numerical order from the first entry of TF register 10; if a branch is determined as going from inside the trace to outside the trace for the first time (the case where the branch prediction is a miss), "false" is held in the entry of TF register 10 corresponding to the determined branch condition.

(2) Among branch instructions J1–J4, the branch instruction branching inside the trace is distinguished as type 1 and the branch instruction branching to the outside of the trace is distinguished as type 2. Branch identification code 15a of instruction operation portion 15 shown in FIG. 4 is provided for distinguishing these types of branches. In branch identification code 15a, "0" is written if a branch is of type 1, and "1" is written if it is of type 2. FIG. 4 shows a branch instruction "TF[1] & TF[2] ? J2". According to this branch instruction, as a result of branch condition C1 determined as "true" and branch condition C2 determined as "false", branch instruction J2 is executed. Therefore, the flow follows a branch to a block F, going out of the trace.

Referring to FIG. 7, since branch instruction with a commit condition "TF[1] & TF[2] & TF[3] ? J3" is of type 2, if branch conditions C1 and C2 are "true" and branch condition C3 is "false", the flow branches to block G which is outside the trace. Meanwhile, although the commit condition "TF[1] & TF[2] & TF[3]" of branch instruction J4 is the same as that of branch instruction J3 described above, the flow branches to block H inside the trace if all the branch conditions C1, C2 and C3 are "true", because the branch instruction with the commit condition "TF[1] & TF[2] & TF[3] ? J3" is of type 1.

Commit condition portion 16 is coded so as to designate the entry number of TF register 10 as described above. FIG. 8 shows the codes of commit condition portion 16.

(1) Commit condition "always" is coded as [X3, X2, X1]=[0, 0, 0] because an instruction is executed regardless of branch conditions. (2) Commit condition "TF[1]" designating the first entry of TF register 10 is coded as [0, 0, 1]. (3) Commit condition "TF[1] & TF[2]" designating the first and second entries of TF register 10 is coded as [0, 1, 1]. (4) Commit condition "TF[1] & TF[2] & TF[3]" designating the first, second and third entries of TF register 10 is coded as [1, 1, 1].

In other words, the commit condition of an instruction executed whether the prediction about true/false of any branch condition is correct or not is coded as "0, 0, 0". The commit condition of an instruction executed if the prediction about true/false of a first one branch condition C1 is correct is coded as "0, 0, 1". The commit condition of an instruction executed if the first two predictions about true/false of the branch conditions are correct is coded as "0, 1, 1". The commit condition of instruction executed if the predictions are correct three times in a row is coded as "1, 1, 1". Therefore, other codes ([1, 0, 1], for example) will never be generated, and commit conditions are coded so as to have successive "1"s starting from X1.

FIG. 9 shows an output form of commit condition decoder 50 decoding the code of commit condition described above. Decoder 50 is formed of 1st to m-th entries similarly to TF register 10. Each entry is formed of 2 bits, validity bit Cv and value bit Cd, also similarly to TF register 10.

Referring to Table 2 below, description will be made of the output form of commit condition decoder 50.

TABLE 2

| validity Cv | value Cd | meaning |
| --- | --- | --- |
| 1 | 1 | true |
| 1 | 0 | false |
| 0 | X | Don't Care |

X: arbitrary value (1) If validity bit Cv is "1" and value bit Cd is "1", the entry is indicated as "true". (2) If validity bit Cv is "1" and value bit Cd is "0", the entry is indicated as "false". (3) If validity bit Cv is "0", the entry is indicated as "Don't Care" regardless of the value of value bit Cd. In other words, each entry has one of "true", "false" and "Don't Care".

Table 3 below is a truth table showing outputs of commit condition decoder 50 corresponding to the code inputs of commit condition portion 16.

TABLE 3

| Input Code [X3, X2, X1] | First Entry (Cv1, Cd1) | Second Entry (Cv2, Cd2) | Third Entry (Cv3, Cd3) |
| --- | --- | --- | --- |
| [0, 0, 0] | (0, X) | (0, X) | (0, X) |
| [0, 0, 1] | (1, 1) | (0, X) | (0, X) |
| [0, 1, 1] | (1, 1) | (1, 1) | (0, X) |
| [1, 1, 1] | (1, 1) | (1, 1) | (1, 1) |

X is an arbitrary value.

(1) If [X3, X2, X1]=[0, 0, 0], input code [0, 0, 0] is decoded so that all the entries have validity bit Cv of "0" (all the entries are "Don't Care").

(2) If [X3, X2, X1]=[0, 0, 1], input code [0, 0, 1] is decoded so that the first entry has validity bit Cv1 of "1" and value bit Cd1 of "1". The other entries have Cv set to "0" (the first entry is "true" and the subsequent entries are "Don't Care").

(3) If [X3, X2, X1]=[0, 1, 1], input code [0, 1, 1] is decoded so that the first and second entries have validity bits Cv1 and Cv2 of "1" and value bits Cd1 and Cd2 of "1" respectively. The other entries have validity bit Cv set to "0". (The first and second entries are "true" and the subsequent entries are "Don't Care".)

(4) If [X3, X2, X1]=[1, 1, 1], input code [1, 1, 1] is decoded so that the first, second, and third entries have validity bits Cv1, Cv2 and Cv3 of "1" and value bits Cd1, Cd2 and Cd3 of "1" respectively. (The first through third entries are "true".) The other entries have Cv set to "0".

That is, input codes are decoded so that [Cv, Cd] in the entry corresponding to "1" in the input code is [1, 1] and Cv of the entry corresponding to "0" in the input code is "0".

Therefore, logical expressions of the truth table in Table 3 can be set as follows.

$$Cvi=Xi, \quad \text{(Equation 1)}$$

$$Cdi=1$$

(where i corresponds to the entry number)

When commit condition codes of branch instructions are to be decoded, the decode contents are different depending on the type of the branch instruction. If the branch instruction is of type 1 (i.e. branch identification code 15a is "0"), the commit condition code is decoded similarly to Table 3. If the branch instruction is of type 2 (i.e. branch identification code 15a is "1"), the commit condition code is decoded in accordance with a truth table shown in Table 4 below instead of Table 3.

TABLE 4

| Input code [X3, X2, X1] | First Entry (Cv1, Cd1) | Second Entry (Cv2, Cd2) | Third Entry (Cv3, Cd3) |
| --- | --- | --- | --- |
| [0, 0, 0] | (0, X) | (0, X) | (0, X) |
| [0, 0, 1] | (1, 0) | (0, X) | (0, X) |
| [0, 1, 1] | (1, 1) | (1, 0) | (0, X) |
| [1, 1, 1] | (1, 1) | (1, 1) | (1, 0) |

X is an arbitrary value.

(1) If [X3, X2, X1]=[0, 0, 0], the input code is decoded similarly to Table 3.

(2) If [X3, X2, X1]=[0, 0, 1], Cd1 is set to "0" and the rest is the same as Table 3.

(3) If [X3, X2, X1]=[0, 1, 1], Cd2 is set to "0" and the rest is the same as Table 3.

(4) If [X3, X2, X1]=[1, 1, 1], Cd3 is set to "0" and the rest is the same as Table 3.

In other words, the input code is decoded so that Cd of the entry corresponding to the last one of the bits having "1" successively in the input code is set to "0" and that entry indicates "false".

Therefore, logical expressions of the truth table shown in Table 4 are set, for example, as follows:

$$Cvi=Xi, \quad \text{(Equation 2)}$$

$$Cdi=Xi+1$$

(where Cd3=0)

Execution control circuit 11 compares the entry which is output from commit condition decoder 50 correspondingly with the entry of TF register 10 having the same entry number, and controls ALU's 2A–2D to execute an instruction sequentially (deterministically) or speculatively (provisionally).

FIG. 10 shows a concept illustrating the function of execution control circuit 11 further in detail. In the figure, (C)–(F) show examples of condition information held in each entry of TF register 10. In (C), for example, the first and second entries hold "true" and the subsequent entries hold arbitrary condition information.

Meanwhile, (A) in FIG. 10 shows the result obtained by decoding commit condition portion 16 "TF[1] & TF[2]" of instruction code "TF[1] & TF[2] ? I3". The first and second entries are both "true" and the subsequent entries are "Don't Care". If (C) is held in TF register 10, i.e. if the true/false coincides with that held in the corresponding entry, execution control circuit 11 controls ALU's 2A–2D to execute instruction I3 sequentially (deterministically). Instruction I3 in this case is called a "sequential instruction".

If (D) is held in TF register 10, i.e. if the first and second entries of TF register 10, corresponding to the first and second entries of commit condition decoder 50 having true/false determined, hold "undetermined", execution control circuit 11 controls ALU's 2A–2D to execute instruction I3 speculatively (provisionally). Instruction I3 in this case is called a "speculative instruction".

If (E) is held in TF register 10, i.e. if the first and second entries of TF register 10, corresponding to the first and second entries of commit condition decoder 50 having true/false determined, hold "true" and "undetermined" respectively, execution control circuit 11 controls ALU's 2A–2D to execute instruction I3 speculative (provisionally). Instruction I3 in this case is also called a "speculative instruction".

If (F) is held in TF register 10, i.e. true/false of the first and second entries of TF register 10 does not coincide with that of the corresponding first and second entries of commit condition decoder 50 having true/false determined, instruction I3 is not executed, or the resultant data is omitted if executed.

Although not shown in FIG. 10, if all the entries of decode output of commit condition portion 16 indicate "Don't Care" (the case where commit condition portion 16 is "always"), execution control circuit 11 controls ALU's 2A–2D to execute an instruction (for example, I1) sequentially (deterministically). Instruction I1 in this case is also called a "sequential instruction" similarly to the case above.

Still referring to FIG. 10, (B) shows the result obtained by decoding commit condition portion 16 "TF[1] & TF[2]" of instruction code "TF[1] & TF[2] ? J2" in FIG. 7. The first entry hold "true", the second entry "false", and the subsequent entries "Don't Care". This branch instruction J2 is executed only if each true/false of the entries of TF register 10 coincides with that of the corresponding entries of commit condition decoder 50 as in (F). J2 is not executed if the result (C), (D) or (E) is obtained.

Sequential register file 12 and shadow register file 13 are formed of 32 registers 30 and 31 respectively. Sequential register file 12 corresponds to register file 1 in the conventional microprocessor. However, sequential register file 12 deterministically holds data obtained as a result of execution of a sequential instruction by ALU's 2A–2D. Shadow register file 13 provisionally holds data obtained as a result of execution of a speculative instruction by ALU's 2A–2D.

Commit control circuit 14 holds the output of commit condition decoder 50 of an instruction corresponding to the resultant data stored in shadow register file 13. At the same time, commit control circuit 14 constantly monitors TF register 10, compares the entries in the output of commit condition decoder 50 with the entries in TF register 10, and, if they coincide with each other in a corresponding manner, transfers the resultant data stored in shadow register file 13 to sequential register file 12.

Referring to FIG. 10, if a speculative instruction I, for example, is executed and the resultant data is stored in shadow register file 13 provisionally, the output of commit condition decoder 50 for instruction I, the first entry "true", the second entry "true", . . . , is stored in commit control circuit 14. Commit control circuit 14 monitors the content held in TF register 10 and transfers the resultant data stored in shadow register file 13 to sequential register file 12 when the first and second entries in TF register 10 both hold "true", i.e. when the content of the output entry of commit condition decoder 50 coincides with true/false of the corresponding entry of TF register 10.

Commit control circuit 14 compares the held entry in the output of commit condition decoder 50 with the entry in TF register 10. If they do not coincide with each other in a corresponding manner, the resultant data stored in shadow register file 13 is determined as invalid and thus canceled.

Now, execution control circuit 11, sequential register file 12, shadow register file 13 and commit control circuit 14 will be described below.

Figure 11:
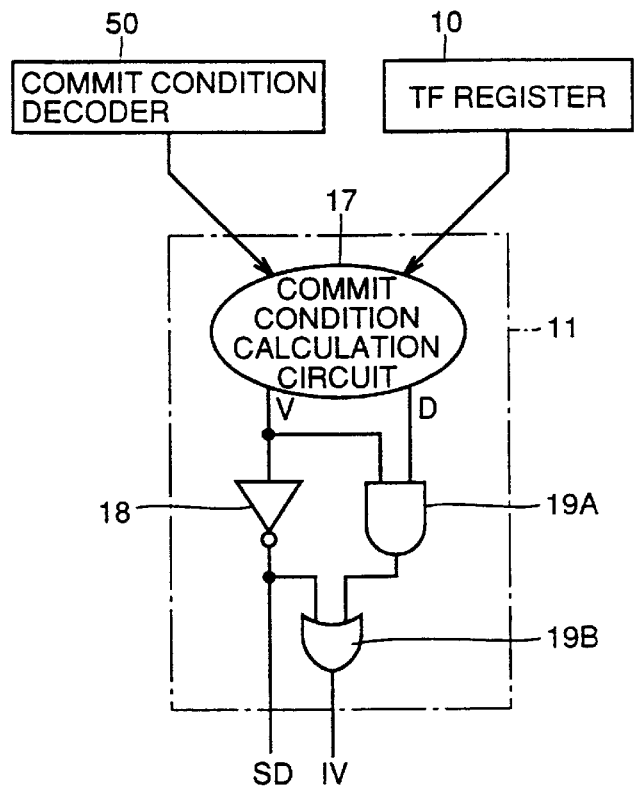
FIG. 11 is a block diagram showing the configuration of the execution control circuit in FIG. 1.

FIG. 11 is a block diagram showing the configuration of execution control circuit 11. Referring to FIG. 11, execution control circuit 11 includes a commit condition calculation circuit 17, an inverter 18, an AND gate 19A, and an OR gate 19B. Execution control circuit 11 outputs a shadow register write designation bit SD from inverter 18 and instruction validity bit IV from OR gate 19B.

Operations of execution control circuit 11 will be described. The content decoded by commit condition decoder 50 and the content of the TF register are applied to commit condition calculation circuit 17, which outputs validity bit V and value bit D.

Figure 12:
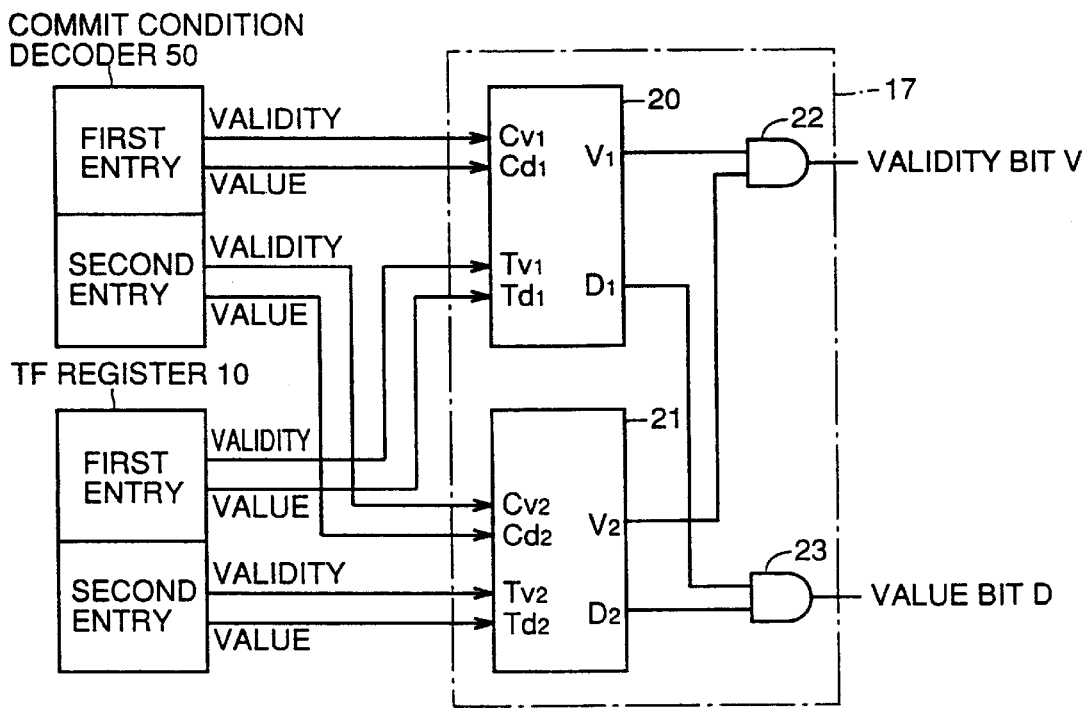
FIG. 12 is a block diagram showing the configuration of the commit condition calculation circuit in FIG. 11.

FIG. 12 is a block diagram showing the configuration of commit condition calculation circuit 17. Referring to FIG. 12, commit condition calculation circuit 17 includes comparison circuits 20 and 21 and AND gates 22 and 23. If there are m entries, m comparison circuits are provided corresponding to the m entries and the logical product of outputs Vi's (i=1~m) of comparison circuits and logical product of outputs Di's (i=1~m) thereof are supplied as validity bit V and value bit D respectively. For simplicity, FIG. 12 shows a commit condition calculation circuit 17 in the case where the decode content of commit condition portion 16 and TF register 10 each have two entries. Comparison circuit 20 or 21 compares the i-th (i=1 or 2) entry from commit condition decoder 50 with the corresponding i-th entry in TF register 10, and generates validity bit Vi and value bit Di in accordance with the result.

Table 5 is a truth table showing operations of comparison circuit 20 or 21.

TABLE 5

| Commit Condition Decoder 50 The i-th Entry | | TF Register 10 The i-th Entry | | The First Entry Comparison Circuit Calculation Result | |
|---|---|---|---|---|---|
| Cv | Cd | Tv | Td | validity | value |
| 0 | X | X | X | 1 | 1 |
| 1 | X | 0 | X | 0 | X |
| 1 | Cd | 1 | Td | 1 | Cd==Td |

X is an arbitrary value.

Referring to Table 5, if validity bit Cv of one entry in commit condition decoder 50 is "0", comparison circuit 20 or 21 generates validity bit Vi of "1" and value bit Di of "1", regardless of the values of validity bit Tv and value bit Td in the corresponding one entry of TF register 10.

If validity bit Cv of one entry in commit condition decoder 50 is "1" and validity bit Tv of the corresponding one entry in TF register 10 is "0", comparison circuit 20 or 21 generates validity bit Vi of "0", regardless of the values of value bits Cd and Td of these entries.

If validity bit Cv of one entry in decoder 50 and validity bit Tv of the corresponding one entry in TF register 10 are both "1" and value bits Cd and Td thereof are equal to each other, comparison circuit 20 or 21 generates validity bit Vi of "1" and value bit Di of "1". If the value bits Cd and Td of these entries are different, comparison circuit 20 or 21 generates validity bit Vi of "1" and value bit Di of "0".

In response to the logical product of validity bits Vi's of comparison circuits 20 and 21 validity bit V of commit condition calculation circuit 17 is generated, and in response to the logical product of value bits Di's, value bit D is generated.

Therefore, if validity bit V and value bit D are both "1", it means that (a) all the entries of commit condition decoder 50 hold "Don't Care" or (b) true/false recorded in the entries of commit condition decoder 50 all coincides with true/false of the corresponding entries of TF register 10. If V=1 and D=0, it means that at least one true/false recorded in the entry of commit condition decoder 50 does not coincide with that of the corresponding entry of TF register 10.

By configuring execution control circuit 11 as shown in FIG. 11, shadow register write designation bit SD of "1" is generated when validity bit V of commit condition calculation circuit 17 is "0". Instruction validity bit IV of "1" is generated when validity bit V and value bit D of commit condition calculation circuit 17 are both "1" or when validity bit V is "0".

As can be seen from the detailed description above, when all the entries in commit condition decoder 50 hold "Don't Care" (when the instruction in the instruction operation portion corresponding thereto is to be executed unconditionally), execution control circuit 11 generates shadow register write designation bit SD of "0" and instruction validity bit IV of "1".

When some entries in commit condition decoder 50 hold "true" or "false" and at least one of the corresponding entries in the TF register holds "undetermined", execution control circuit 11 generates shadow register write designation bit SD of "1" and instruction validity bit IV of "1".

When some entries in commit condition decoder 50 hold "true" or "false" and the corresponding entries in TF register 10 hold "true" or "false" and true/false in commit condition portion 16 correspondingly coincides with true/false in TF register 10, execution control circuit 11 generates shadow register write designation bit SD of "0" and instruction validity bit IV of "1".

Storing data to sequential register file 12 and shadow register file 13 is controlled as follows in accordance with shadow register write designation bit SD and instruction validity bit IV.

(a) If (SD, IV)=(0, 1), the resultant data generated by, for example, an ALU is stored in sequential register file 12. That is, data is deterministically held.

(b) If (SD, IV)=(0, 0), the instruction is not executed or the resultant data generated by execution of the instruction is not stored either in sequential register 12 or shadow register 13 but omitted.

(c) If (SD, IV)=(1, 1), the resultant data generated by, for example, an ALU is stored in shadow register file 13. That is, data is provisionally held.

Figure 13:
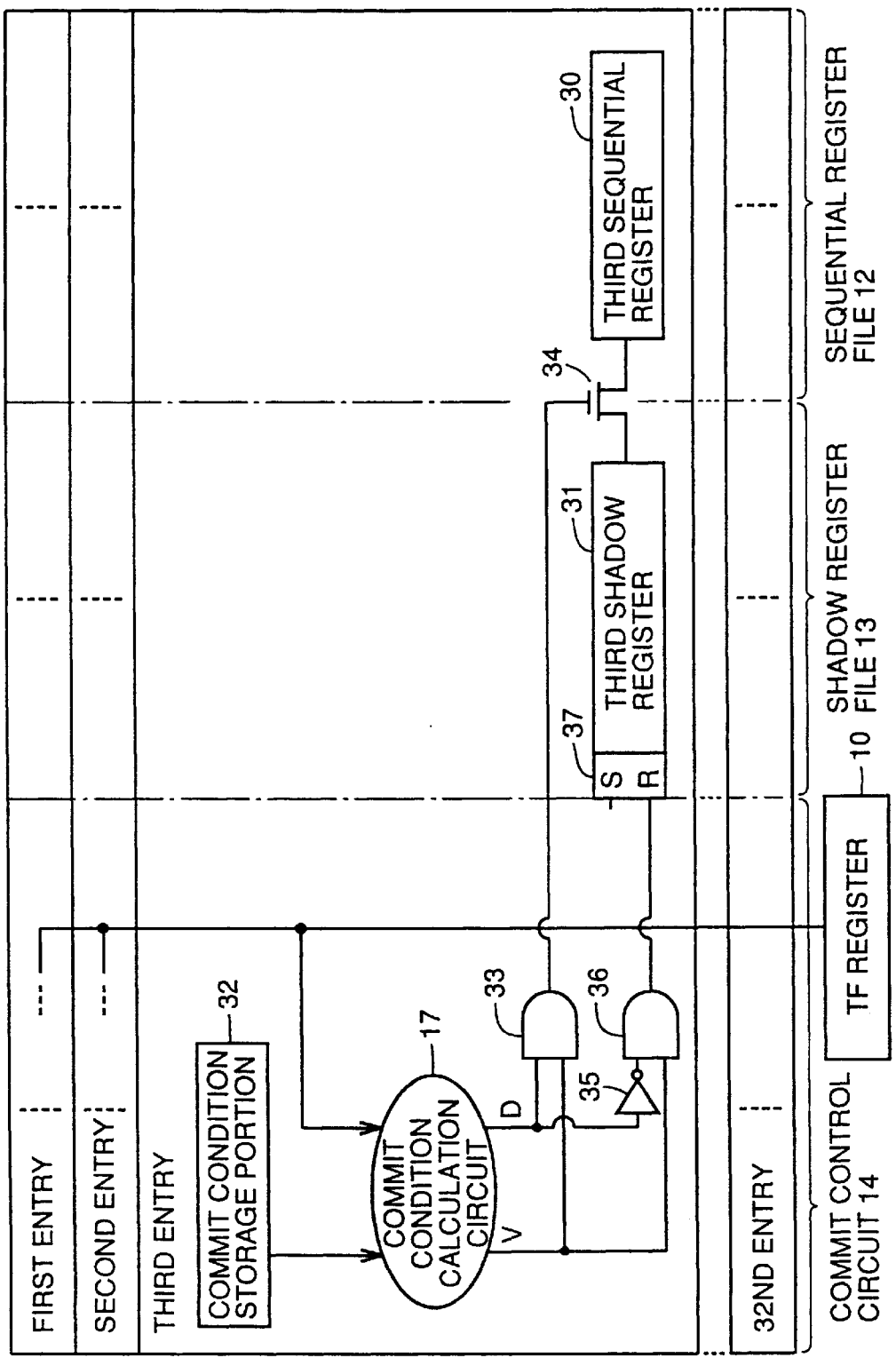
FIG. 13 is a block diagram showing the configurations of a sequential register file, a shadow register file, and a commit control circuit in the processing device of FIG. 1.

FIG. 13 is a block diagram showing the configurations of sequential register file 12, shadow register 13 and commit control circuit 14.

Referring to FIG. 13, sequential register file 12 is formed of 32 sequential resisters as described above. Shadow register file 13 is formed of 32 shadow registers. In FIG. 13, a third sequential register 30 of sequential register file 12 and a third shadow register 31 of shadow register file 13 are shown. Each register of shadow register file 13 is provided with a valid flag 37.

Commit control circuit 14 is formed of 32 entries corresponding 32 sequential registers 30 and 32 shadow registers 31. Each entry includes a commit condition storage portion 32, commit condition calculation circuit 17, AND gates 33 and 36, and an inverter 35.

When a speculative instruction is executed and the resultant data thereof is provisionally stored in shadow register 31 of shadow register file 13, commit condition storage portion 32 holds the content, decoded by commit condition decoder 50, of commit condition portion 16 corresponding to the instruction.

Commit condition calculation circuit 17 is the same as commit condition calculation circuit 17 in execution control circuit 11 described above. Circuit 17 compares the decode content of commit condition portion 16 held in commit condition storage portion 32 with TF register 10 and generates validity bit V and value bit D in accordance with the result. AND gate 33 provides the logical product of validity bit V and value bit D of commit condition calculation circuit 17 to the gate of a transfer gate 34 connected between sequential register 30 and shadow register 31.

Commit condition calculation circuit 17 constantly monitors TF register 10 and generates validity bit V of "1" and value bit D of "1" when true/false in commit condition portion 16 held by commit condition storage portion 32 correspondingly coincides with true/false in TF register 10. As a result, transfer gate 34 turns on and the resultant data in shadow register 31 is transferred to sequential register 30.

Validity bit V is applied to AND gate 36, which also receives value bit D through inverter 35. AND gate 36 outputs "H" only if V=1 and D=0, i.e. if true/false held in the entry of commit condition decoder 50 does not coincide with true/false held in the corresponding entry of TF register 10. AND gate 36 is connected to a reset terminal of valid flag 37. When the reset terminal receives "H", a flag indicating the data of the shadow register is invalid is generated. When the flag is generated, data transfer from shadow register 31 to sequential register 30 is inhibited.

The hardware can also be structured so as to erase data held in shadow register 31 in response to the "H" input from AND gate 36 in addition to valid flag 37.

Next, operations of the microprocessor in accordance with the present embodiment will be described with regard to a case where the program shown in FIG. 7 is to be executed.

Referring to FIG. 7, each row is formed of a plurality of instruction codes and instructions indicated at instruction operation portions 15 of the instruction codes in the same row are executed simultaneously. In a first cycle, four instructions I1, I2, C2 and I3 in a first row are executed simultaneously.

It is assumed that condition information of each entry in TF register 10 is all "undetermined" (all the validity bits Tv's are "0"). In the figure, r0, r1, r6, r7, r12, r13, r14, and r15 indicate registers of sequential register file 12.

According to instruction code "always ? I1", instruction I1 is executed unconditionally. Commit condition decoder 50 decodes input code [0, 0, 0] of commit condition portion 16 and sets Cv's of all the entries to "0", that is setting all the entries to "Don't Care". Therefore, execution control circuit 11 controls ALU 2A to execute instruction I1 deterministically. At this time, data of registers r0 and r1 in sequential register file 12 are added and the resultant data is deterministically stored in register r2 of sequential register file 12. According to instruction code "TF[1] ? I2", code [0, 0, 1] of commit condition portion 16 is decoded, as shown in Table 3, so that only Cv1 and Cd1 of the first entry are both "1". Meanwhile, since all the entries of TF register 10 are "undetermined" at this point, execution control circuit 11 controls ALU 2B to provisionally execute instruction I2. More specifically, data of registers r12 and r13 in sequential register file 12 are added by ALU 2B, and the resultant data is provisionally stored in register r4 in shadow register file 13. At the same time, the decode content of commit condition portion 16 "Cv1='1', Cd1='1', Cv2='0', . . . " is stored in the commit condition storage portion in the fourth entry of commit control circuit 14, corresponding to register r4.

According to instruction code "always ? C2", instruction C2 is executed unconditionally similarly to "always ? I1".

More specifically, ALU 2C determines whether the data stored in register r12 of sequential register file 12 is 0 or not, and writes "true" (Tv2="1" and Td2="1") to the second entry of TF register 10 if it is equal to 0, or otherwise "false" (Tv2="1" and Td2="0").

According to instruction code "TF[1] & TF[2] ? I3", code [0, 1, 1] of commit condition portion 16 is decoded as in Table 3 so that Cv1 and Cd1 of the first entry and Cv2 and Cd2 of the second entry are all "1". Since the first entry remains to be "undetermined" at the time of executing the first cycle, execution control circuit 11 controls ALU 2D to provisionally execute instruction I3. More specifically, the data stored in registers r14 and r15 of sequential register file 12 are added by ALU 2D and the resultant data is stored in register r6 of shadow register file 13. At the same time, the decode content of commit condition portion 16 "Cv1='1', Cvd='1', Cv2='1', Cd2='1', . . . " is stored in commit condition storage portion 32 in an entry corresponding to register r6.

Next, instructions in a second row shown in FIG. 7 are to be executed simultaneously in a second cycle.

According to instruction code "always ? C1", data of register r2 in shadow register file 13 is unconditionally compared with the data of register r3 in sequential register file 12, and, if r2≧r3, "true" is written in the first register of TF register 10, or otherwise "false" is written therein.

According to instruction code "always ? C3", true/false of branch condition C3 is written into the third register of TF register 10 in a similar manner.

According to instruction code "TF[1] & TF[2] & TF[3] ? I4", code [1, 1, 1] of commit condition portion 16 is decoded so that Cv1 and Cd1 of the first entry, Cv2 and Cd2 of the second entry and Cv3 and Cd3 of the third entry are all "1". Since the entries of TF register 10 other than the second entry are "undetermined" at this point, execution control circuit 11 controls ALU 2B to provisionally execute instruction I4. More specifically, ALU 2B adds "1" to data stored in register r6 of shadow register file 13 and the resultant data is stored in register r7 of shadow resister file 13. The decode content of commit condition portion 16 is stored in commit control circuit 14 at a portion corresponding to register r7.

Next, instructions in a third row shown in FIG. 7 are to be executed simultaneously in a third cycle.

According to instruction code "TF[1] ? J1", J1 is a branch instruction of type 2. Branch identification code 15a in the instruction code is labeled with "1" (FIG. 4). According to the branch identification code, commit condition decoder 50 decodes the input code of the commit condition based on the truth table shown in Table 4. In this case, with input [0, 0, 1], the first entry is (Cv1, Cd1)=(1, 0) and other Cv's are "0".

Upon completion of the second cycle, the true/false of the first entry of TF register 10 is determined by execution of instruction C1.

If the first entry is "true" ((Tv1, Td1)=(1, 1)), execution control circuit 11 determines that (Tv1, Td1)=(1, 1) does not coincide with (Cv1, Cd1)=(1, 0) and controls program counter 4 so that branch instruction J1 is not executed. Meanwhile, if the first entry is "false" ((Tv1, Td1=(1, 0)), it coincides with (Cv1, Cd1)=(1, 0), and therefore branch instruction J1 is executed. The address designating block E is calculated by target address calculation circuit 9 and stored in program counter 4.

In instruction codes "TF[1] & TF[2] ? J2" and "TF[1] & TF[2] & TF[3] ? J3", J2 and J3 are branch instructions of type 2 and therefore the commit conditions are decoded according to Table 4 similarly to the above-described case. In instruction code "TF[1] & TF[2] & TF[3] ? J4", since J4 is a branch instruction of type 1 the commit condition is decoded in accordance with the truth table shown in Table 3 as (Cv1, Cd1)=(1, 1), (Cv2, Cd2)=(1, 1) and (Cv3, Cd3)=(1, 1).

Thus, whether branch conditions C1–C3 are inside the trace (A→B→C→D→H) or not is recorded in TF register 10. More specifically, any one of the following is recorded in TF register 10 (where "·" is an arbitrary value): (1) for A→H branch (a branch inside the trace), (TF[1], TF[2], TF[3])=(true, true, true); (2) for A→G branch (a branch outside the trace), (TF[1], TF[2], TF[3])=(true, true, false); (3) for A→F branch (a branch outside the trace), (TF[1], TF[2], TF[3])=(true, false, ·); and (4) for A→E branch (a branch outside the trace), (TF[1], TF[2], TF[3])=(false, ·, ·). In other words, each TF[i] indicates a path of the control flow. As long as "true" appears successively in the order of entry number starting from TF[1], the branch is made inside the trace. Meanwhile, the entry corresponding to the point diverting from the trace is made "false", indicating the branch is directed to the outside of the trace.

By recording condition information in TF register 10, a branch instruction among J1–J4 corresponding to the actually executed control flow is executed. For example, if (TF[1], TF[2], TF[3])=(true, true, true) is stored in TF register 10, only J4 is executed based on commit condition portion 16 and jump identification code 15b. If (TF[1], TF[2], TF[3])=(true, true, false) is recorded, only J3 is executed.

At the end of the second cycle, since the results of determinations about true/false of branch conditions C1, C2, and C3 are held in TF register 10, commit operation is performed on the data provisionally executed and stored in shadow register file 13 in the first and second cycles. If the commit conditions stored in commit condition storage portion 32 of commit control circuit 14 is determined by commit condition calculation circuit 17 to coincide with the value of TF register 10, the data in shadow register file 13 is transferred to sequential register file 12. Meanwhile, if the commit condition does not coincide with the value of TF register 10, the data in shadow register file 12 is omitted by valid flag 37. For example, if (TF[1], TF[2], TF[3]=(true, true, false) is decoded, the data resulting from execution of instructions I2 and I3 stored in shadow register file 13 is transferred to sequential register file 12 and the resultant data of instruction I4 is omitted.

If the data determined as invalid is kept to be held in shadow register file 13, it may be transferred by mistake to the sequential file upon execution of the next program, thereby causing malfunction. Therefore, such data must be omitted in order to prevent such malfunction.

The data of shadow register file 13 thus omitted is erased by overwriting the data resulting from execution of the next program.

As described above, in accordance with the first embodiment, an instruction to be executed based on one or more conditions essentially is executed before a determination is made about true/false of the conditions. For example, according to the program shown in FIG. 7, although instruction I2 is to be executed based on condition C1, it is speculatively executed in the first cycle before a determination is made about true/false of condition C1. Similarly, although instruction I3 is also to be executed based on condition C1, it is speculatively executed in the first cycle before a determination is made about true/false of condition C1. Furthermore, although instruction I4 is to be executed based on conditions C1 and C2, it is speculatively executed in the first cycle before a determination is made about true/false of the conditions C1 and C2.

Therefore, speculative instructions I2 through I4 are executed in the first cycle, which is impossible with the conventional microprocessor, thereby effectively utilizing ALU's 2A–2D. As a result, processing speed of instructions can be enhanced.

Since the commit condition code included in the instruction code is required only to designate the entry of the TF register corresponding to the trace, the number of bits forming the commit condition code need only be n bits for n branch conditions. Commit condition decoder 50 generates entries formed of 2n bits for comparison with respective entries of TF register 10. Although the output entries of commit condition decoder 50 can be directly used as the commit condition codes, they require 2n bits, whereby the number of bits in the commit condition code to be stored in memory 3 is simply doubled as compared with the present embodiment. Therefore, the number of bits in the commit condition code can be reduced by providing commit condition decoder 50 described above so as to save the capacity of the memory element of memory 3.

Although the execution program is compiled so that "true" is successively held, such as "true, true, true, . . . ", in the entries of TF register 10 indicating a branch inside the trace, the present invention is not limited thereto. The branch inside the trace can be set arbitrarily such as "false, false, false, . . . " and "true, false, true, false, . . . ". Decode operation of commit condition decoder 50 need only be structured so that for an instruction with a commit condition code to be executed inside the trace, the decode content coincides with each entry to be held in TF register 10 indicating a branch inside the trace which is set arbitrarily (these entries are hereinafter referred to as a true/false entry group).

Second Embodiment

FIG. 14 shows codes of commit condition portion 16 coded in a different manner from those in FIG. 8 of the first embodiment. Since commit condition portion 16 is structured to determine whether an instruction in instruction portion 15 attached thereto is a branch inside the trace or not, it can be coded to designate the entry of the TF register in which the result of determination of a branch condition is written and which is used to determine whether the instruction in instruction operation portion 15 is valid or not, is written.

In the figure, commit condition TF[1] is coded as [Y2, Y1]=[0 , 1] to designate the first entry of TF register 10. Commit condition TF[1] & TF[2] is coded as [1, 0] to designate the second entry. Similarly, commit condition TF[1] & TF[2] & TF[3] is coded as [1, 1] to designate the third entry. Commit condition "always" is coded as [0, 0].

Commit condition decoder 50 decodes [Y2, Y1] in FIG. 14 to [X3, X2, X1] in FIG. 11 and further decodes [X3, X2, X1] in accordance with Tables 3 and 4. Decoding [Y2, Y1] to [X3, X2, X1] is obtained by the following logical expressions.

$$X1=Y1+Y2 \quad \text{(Equation 3)}$$

$$X2=Y2$$

$$X3=Y1*Y2$$

where "+" represents a logical sum and "*" represents a logical product.

Therefore, decoding of code [Y2, Y1] of commit condition portion 16 to the value (Cv, Cd) in Tables 3 and 4 can be obtained by the following logical expressions.

For decoding to (Cv, Cd) in Table 3:

$$(Cv1, Cd1)=(Y1+Y2, 1) \quad \text{(Equation 4)}$$

$$(Cv2, Cd2)=(Y2, 1)$$

$$(Cv3, Cd3)=(Y1*Y2, 1)$$

For the branch instruction of type 2 shown in Table 4:

$$(Cv1, Cd1)=(Y1+Y2, Y2) \quad \text{(Equation 5)}$$

$$(Cv2, Cd2)=(Y2, Y1*Y2)$$

$$(Cv3, Cd3)=(Y1*Y2, 0)$$

FIG. 15 is a logical circuit diagram showing an example of the structure of commit condition decoder 50 in accordance with these equations. Commit condition decoder 50 includes an instruction decoder 40, OR gates 55, 57, and 58, an AND gate 56 and an inverter 59.

In response to an input from instruction operation portion 15, instruction decoder 40 outputs "0" if the instruction of instruction operation portion 15 is a normal instruction, and directly outputs branch identification code 15a ("0" for a branch instruction of type 1, and "1" for a branch instruction of type 2) if it is a branch instruction with branch identification code 15a.

When "0" is output from instruction decoder 40, Cd1 through Cd3 indicate "1" and Equation 4 above is obtained. Meanwhile, when "1" is output from instruction decoder 40, Cd1=Y2, Cd2=Y1*Y2, and Cd3=0 and the equation 5 above is obtained.

As shown in FIG. 14, since the code of commit condition portion 16 is structured so as to designate only the entry number of TF register 10 corresponding to a branch condition about which the validity of the instruction is determined, the commit condition can be coded with a minimum integral number of bits at least equal to $\log_2(n+1)$ for n branch conditions. As a result, the number of bits in the commit condition code can be further reduced, thereby further saving the capacity of memory 3.

Third Embodiment

Commit control circuit 14 of the first embodiment includes commit condition storage portion 32 and commit condition calculation circuit 17 as shown in FIG. 14. When a speculative instruction is executed and the resultant data is provisionally stored in shadow register 31 of shadow register file 13, commit condition storage portion 32 holds the decode content of the commit condition portion 16 corresponding to the instruction. However, portion 32 does not hold the decode content of the commit condition portion of the instruction code for executing a branch instruction.

As apparent from Equation 1 in the first embodiment, decode output Cdi of commit condition portion 16 held as a result of execution of the speculative instruction is always "1". Consequently, the information recorded in commit condition storage portion 32 can be only Cvi. In accordance with this approach, only half an amount of storage information need be stored as compared to the first embodiment in which both Cvi and Cdi are stored.

FIG. 16 is a circuit diagram showing an example of the configuration of comparison circuit 20 or 21 provided in commit condition calculation circuit 17 of commit control circuit 14 in accordance with the third embodiment. Referring to FIG. 16, the comparison circuit includes AND gates 60 and 63, an inverter 61, and an NAND (negative logic)

gate 62. The logical expressions of the circuit diagram in FIG. 16 are as follows:

$$V_i = /C_{vi} + T_{vi} \quad \text{(Equation 6)}$$

$$D_i = (T_{di} * T_{vi}) + /C_{vi}$$

where "/" represents a logical NOT, "+" represents a logical sum, and "*" represents a logical product.

(1) If $C_{vi}=0$, then $V_i$ and $D_i$ are both 1. (2) If $C_{vi}=1$ and $T_{vi}=0$, then $V_i=0$. (3) If $C_{vi}=1$ and $T_{vi}=1$, then $V_i=1$ and $D_i=T_{di}$. Assuming that $C_{di}$ is always equal to 1 although $C_{di}$ is not actually input, the comparison circuit performs substantially the same operations as shown in the truth table of Table 5 in the first embodiment.

Commit control circuit 14 in accordance with the third embodiment is formed of a commit condition calculation circuit of FIG. 13 employing the comparison circuit shown in FIG. 16, and the commit condition storage portion for storing only $C_{vi}$ in the output of commit condition decoder 50.

Although the present invention has been described and illustrated in detail, it is-clearly understood that the same is by way of illustration and example only and is not to be taken by way of limitation, the spirit and scope of the present invention being limited only by the terms of the appended claims.

What is claimed is:

1. A compiler for compiling a source program including an instruction to be executed based on one or more branch conditions to an object program including said instruction and a commit condition for which a result of execution of said instruction becomes valid, comprising:

branch prediction means for making evaluations of said one or more branch conditions along a predicted trace by predicting whether status of each of said one or more branch conditions is true or false;

condition change means for changing at least one of the evaluations of said one or more branch conditions made by the branch prediction means by changing said one or more branch conditions to provide all of said one or more branch conditions along the predicted trace with same status; and providing means for providing said instruction with said commit condition indicating number of said one or more branch conditions along the predicted trace whose evaluations for said same status as changed by said condition change means have to be correct for execution of said instruction to be valid.

* * * * *